United States Patent
Takagi

(10) Patent No.: US 7,241,158 B2
(45) Date of Patent: Jul. 10, 2007

(54) OPTICAL DISK REPRODUCING DEVICE AND ADAPTER FOR PLUG

(75) Inventor: Kentaro Takagi, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 11/406,402

(22) Filed: Apr. 19, 2006

(65) Prior Publication Data

US 2006/0240705 A1    Oct. 26, 2006

(30) Foreign Application Priority Data

Apr. 20, 2005    (JP) .................... P2005-121882

(51) Int. Cl.
*H01R 29/00*    (2006.01)
*H01R 24/04*    (2006.01)

(52) U.S. Cl. .................... 439/188; 439/668; 439/669

(58) Field of Classification Search ................ 439/668, 439/669, 188; 200/51.09
See application file for complete search history.

(56) References Cited

U.S. PATENT DOCUMENTS

| | | |
|---|---|---|
| 4,433,209 A | 2/1984 | Kurosawa et al. |
| 5,056,148 A | 10/1991 | Hayashi |
| 5,581,626 A | 12/1996 | Palmer |
| 6,069,960 A | 5/2000 | Mizukami et al. |
| 6,126,465 A * | 10/2000 | Franks, Jr. .................... 439/218 |
| 6,149,469 A * | 11/2000 | Kim ............................. 439/668 |
| 6,262,958 B1 * | 7/2001 | Ogihara et al. ........... 369/53.44 |
| 6,321,278 B1 | 11/2001 | Phu et al. |
| 6,394,852 B1 * | 5/2002 | Huang ......................... 439/669 |
| 7,094,087 B2 * | 8/2006 | Larn ............................ 439/188 |
| 2001/0029616 A1 | 10/2001 | Jin |
| 2003/0185400 A1 | 10/2003 | Yoshizawa et al. |

FOREIGN PATENT DOCUMENTS

| | | |
|---|---|---|
| EP | 1 298 960 A2 | 4/2003 |
| GB | 2 360 182 A | 9/2001 |
| JP | 8-111900 | 4/1996 |
| JP | 2003-204600 | 7/2003 |
| JP | 2004-282395 | 10/2004 |

* cited by examiner

*Primary Examiner*—Xuong Chung-Trans
(74) *Attorney, Agent, or Firm*—Morgan, Lewis & Bockius LLP

(57) ABSTRACT

In a structure for setting an audio signal outputted by an audio information processing part to a signal of a kind corresponding to the detected results of switches, when a plug having the length of a signal side contact longer than the standard of an RCA pin plug is connected to RCA pin jacks, the switches are respectively attached to positions to be operated by the signal side contact of the plug and not to be operated by the signal side contact of the RCA pin plug. When the operating states of the switches show that the plug is not connected to the RCA pin jacks, the audio signal outputted by the audio information processing part is set to a signal of a kind set by a user.

2 Claims, 6 Drawing Sheets

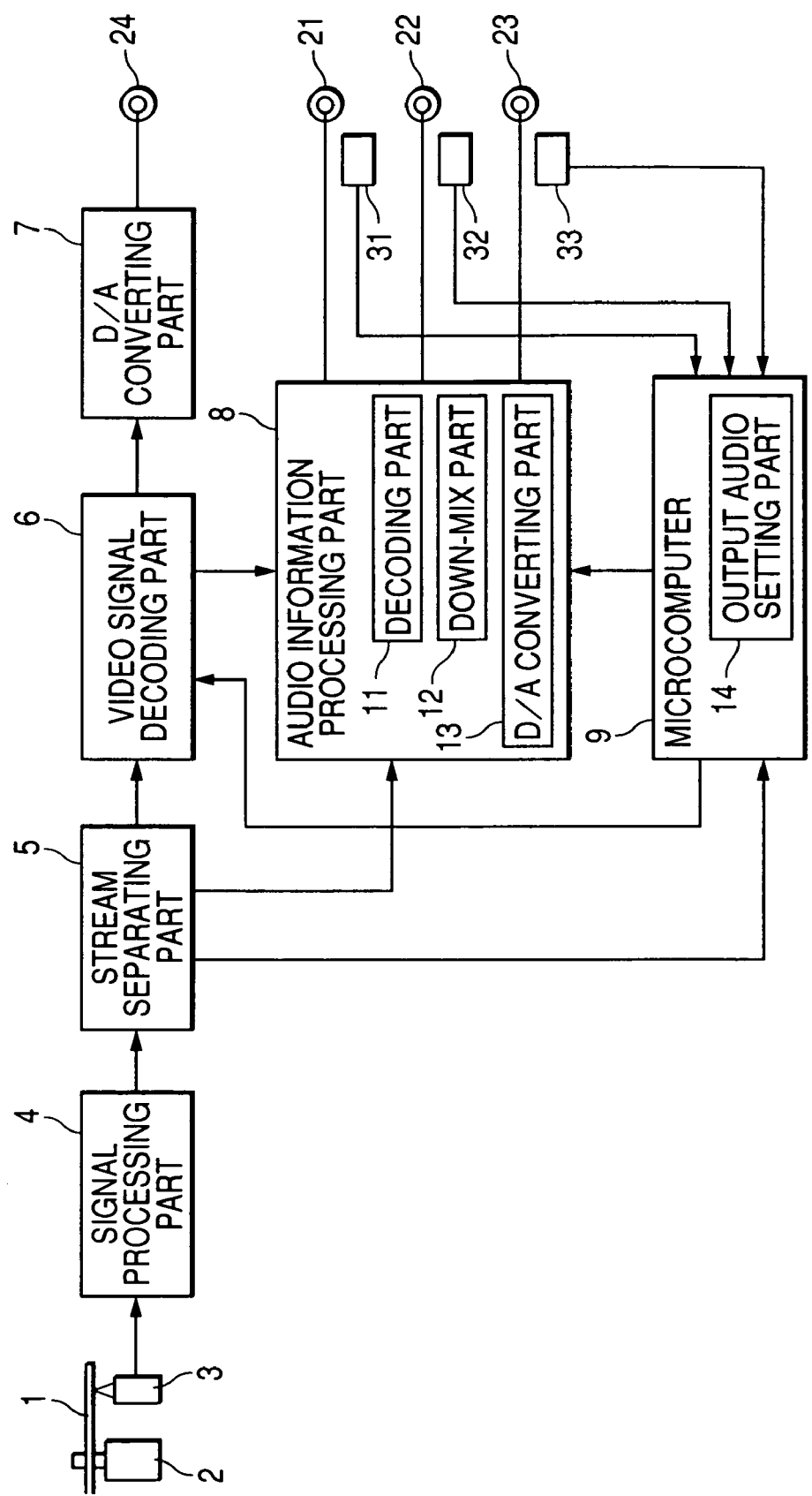

OPTICAL DISK REPRODUCING DEVICE AND ADAPTER FOR PLUG

BACKGROUND OF THE INVENTION

1. Field of the Invention

The present invention relates to an optical disk reproducing device for outputting analog audio signals of two channels obtained by performing a prescribed process to audio information and a digital audio signal based on the audio information by using an RCA pin jack. More particularly, the present invention relates to an optical disk reproducing device for setting an outputted audio to a kind corresponding to the state of a connection of an RCA pin jack and an adapter for a plug usable for the optical disk reproducing device.

2. Description of the Related Art

In a DVD widely spread nowadays, kinds of reproduced audio can be switched to a Dolby Digital 2 ch (refer it simply to as a 2 ch, hereinafter), a Dolby Digital 5.1 ch (refer it simply to as a 5.1 ch, hereinafter) or a DTS (Digital Theater System) 5.1 ch. However, even when the 2 ch, the 5.1 ch or the DTS 5.1 ch is displayed on a setting screen, most of users hardly correctly understand the meaning of the display. Further, when the audio output of the 2 ch and the output of a video signal of a DVD player are connected to a television receiver, however, a digital audio output is not connected to a device capable of outputting the 5.1 ch, even if the 5.1 ch is selected, the audio of two channels of the 5.1 ch is merely outputted from the television receiver (most of the users do not notice it).

In order to overcome the above-described circumstances, a below-described technique is proposed (refer it to as a first related art). In this technique, six amplifiers provided for outputting the audio of the 5.1 ch are respectively provided with electric current detecting parts for detecting entering electric current. Then, for the amplifiers respectively, it is examined from the detected results of the electric current detecting parts when audio signals whose frequencies are swept are supplied to the amplifiers, whether or not a speaker is connected respectively to the amplifiers, or whether or not the speaker is a speaker for a low-pitched tone when the speaker is connected respectively to the amplifiers. Then, in accordance with the state of the speaker connected to the amplifiers respectively, a kind (a pattern of a reproduced form) of an optimum audio output is automatically selected and the kind of the selected audio is displayed on a display part. Further, a signal processing circuit is automatically set so that the kind of an audio signal outputted by the signal processing circuit corresponds to the kind of the selected audio signal. Further, this technique also discloses that a function is provided for displaying a kind of an audio output that can be selected by a user in accordance with the state of the speaker connected respectively to the amplifiers without the automatic selection (for instance, see JP-A-2003-204600).

Further, a below-described technique is proposed (refer it to as a second related art). In this technique, the connecting state of a cable of a 4-channel audio output terminal to which an audio connecting cable is connected is detected by using an output terminal connection detecting part. Then, an audio signal transmitted to the audio output terminal is switched to a signal of an optimum mode in accordance with the detected result (for instance, see JP-A-8-111900).

A below-described technique is proposed by the applicant of this application of the present invention (refer it to as a third related art). In this technique, a speaker unit and an RCA pin plug are provided in an accessory speaker. The RCA pin plug is electrically connected to the speaker unit. In a television receiver side, an RCA pin jack is provided and an audio signal is guided to the RCA pin jack. In an interior side of the RCA pin jack, a switch is provided that is pressed by an end part of the RCA pin plug so that its connecting state is switched. In the connecting state when the switch is not pressed by the RCA pin plug, the accessory speaker is not connected to the switch so that a stereo audio is outputted by two incorporated speakers provided in the television receiver. On the other hand, in the connecting state when the switch is pressed by the RCA pin plug, the accessory speaker is connected to the switch so that a stereo audio is outputted from a pair of right and left accessory speakers and a mono-ral audio obtained by adding the stereo audio signal is outputted from the two incorporated speakers. That is, when the accessory speaker is connected to the television receiver, the speakers incorporated in the television receiver are used as pseudo center speakers to obtain a surrounding effect (for instance, see JP-A-2004-282395).

SUMMARY OF THE INVENTION

In a DVD player, an RCA pin jack for outputting an analog audio signal or an RCA pin jack (a coaxial output terminal) for outputting a digital audio signal is provided. Then, when a kind of audio outputted is to be set depending on whether or not an RCA pin plug is connected to the RCA pin jack, if the above-described related art is employed, below-described problems arise.

That is, in the first related art, for the amplifiers respectively, it is examined whether or not a speaker is connected respectively to the amplifiers, or whether or not the speaker is a speaker for a low-pitched tone when the speaker is connected respectively to the amplifiers. Then, in accordance with the state of the speaker connected to the amplifiers respectively, a kind of an optimum audio output is automatically selected. That is, the first related art shows a technique that does not need to detect whether of not the plug is connected to the RCA pin jack. Therefore, the first related art is hardly applied to the case that the kind of the outputted audio is to be set depending on whether or not the RCA pin plug is connected to the RCA pin jack.

The second related art discloses that the connecting state of a cable of a 4-channel audio output terminal to which an audio connecting cable is connected is detected by using an output terminal connection detecting part, and then, an audio signal transmitted to the audio output terminal is switched to a signal of an optimum mode in accordance with the detected result. However, in the second related art, a method for detecting the connecting state of the cable is not specifically disclosed. Accordingly, the second related art is hardly applied to the case that the kind of the outputted audio is to be set depending on whether or not the RCA pin plug is connected to the RCA pin jack.

In the third related art, in an interior side of the RCA pin jack, a switch is provided that is pressed by an end part of the RCA pin plug so that its connecting state is switched. That is, the third related art shows a technique disclosing a specific structure for detecting whether or not the RCA pin plug is connected to the RCA pin jack. Therefore, the third related art is applied to the case that the kind of the outputted audio is to be set depending on whether or not the RCA pin plug is connected to the RCA pin jack.

However, when the outputted audio is automatically set depending on whether or not the RCA pin plug is connected to the RCA pin jack, even if a user desires to change the kind of the outputted audio by himself or by herself, the user cannot inconveniently change the kind of the audio. On the other hand, the first related art also discloses a function for displaying kinds of audio outputs by which an automatic selection can be realized and kinds of the audio outputs can be selected by the user in accordance with the state of the speaker connected respectively to the amplifiers. However, in order to make this function effective, a mode for carrying out the automatic selection and a mode for realizing the selection by the user need to be switched. That is, under a state that a setting screen is displayed, an operation is required for switching the mode by using a remote controller. However, since a setting operation by using the remote controller is complicated, a method is required for making a procedure for switching the mode more understandable.

The present invention is devised to solve the above-described problems and it is an object of the present invention to provide an optical disk reproducing device in which an automatic setting of a kind of audio corresponding to a connecting state and a setting of a kind of audio by a user can be switched depending on a kind of a plug connected to an RCA pin jack and when one of audio signals of two channels is not connected, this fact can be informed.

Further, it is an object of the present invention to provide an optical disk reproducing device in which a connection detecting switch is provided that operates when a switch operating connection plug in which a form except the length of a signal side contact corresponds to the standard of an RCA pin plug and the length of the signal side contact is longer than the standard of the RCA pin plug is connected to an RCA pin jack, and does not operate when the RCA pin plug is connected to the RCA pin jack, so that an automatic setting of a kind of audio corresponding to a connecting state and a setting of a kind of audio by a user can be switched depending on the kind of the plug connected to the RCA pin jack.

Further, it is an object of the present invention to provide an adapter for a plug having a plug part in which a form except the length of a signal side contact corresponds to the standard of an RCA pin plug and the length of the signal side contact is longer than the standard of the RCA pin plug and a jack part to which the RCA pin plug can be connected, the plug part and the jack part being formed integrally, so that even when a kind of an audio corresponding to a connecting state is automatically set, a cable having the RCA pin plugs connected to both sides of end parts can be used.

In order to solve the above-described problems, an optical disk reproducing device according to the present invention is applied to an optical disk reproducing device including: an audio information processing part for inputting audio information reproduced from an optical disk and outputting analog audio signals of two channels obtained by performing a prescribed process to the audio information and a digital audio signal based on the audio information; a first RCA pin jack to which one signal of the analog audio signals of the two channels is guided; a second RCA pin jack to which the other signal of the analog audio signals of the two channels is guided; a third RCA pin jack to which the digital audio signal is guided; a first connection detecting switch provided in the vicinity of the first RCA pin jack; a second connection detecting switch provided in the vicinity of the second RCA pin jack; a third connection detecting switch provided in the vicinity of the third RCA pin jack; and an output audio setting part for setting the analog audio signals and the digital audio signal outputted by the audio information processing part to signals of kinds corresponding to the operating states of the first to third connection detecting switches. When a switch operating connection plug in which a form except the length of a signal side contact corresponds to the standard of an RCA pin plug and the length of the signal side contact is longer than the standard of the RCA pin plug is connected to the corresponding RCA pin jack of the first to third RCA pin jacks, the first to third connection detecting switches are respectively attached to positions to be operated by the signal side contact of the switch operating connection plug, and when the RCA pin plug is connected to the corresponding RCA pin jack of the first to third RCA pin jacks, the first to third connection detecting switches are respectively attached to positions not to be operated by the signal side contact of the RCA pin plug. Further, when the operating states of the first to third connection detecting switches show that the switch operating connection plug is not connected to any of the first to third RCA pin jacks, the output audio setting part sets the audio signals outputted by the audio information processing part to the signals of the kinds set by a user, and when only one of the first connection detecting switch and the second connection detecting switch is in an operating state, the output audio setting part sets the analog audio signals of the two channels outputted by the audio information processing part to the signals corresponding to the audio of the two channels and displays on a display device a message showing that a connection of one of the RCA pin jack of the first or the second RCA pin jack is not carried out.

Namely, when the RCA pin plug is connected to the RCA pin jack, the connection detecting switch does not operate. Accordingly, the audio signal outputted from the RCA pin jack shows a signal of a kind set by the user. On the other hand, when the switch operating connection plug is connected to the RCA pin jack, the connection detecting switch operates. Accordingly, the audio signal outputted from the RCA pin jack is automatically set to the signal of a kind corresponding to the connecting state. Further, one of the analog audio signals of the two channels is not connected, the message showing this fact is displayed.

Further, an optical disk reproducing device according to the present invention is applied to an optical disk reproducing device including: an audio information processing part for inputting audio information reproduced from an optical disk and outputting audio signals obtained by performing a prescribed process to the audio information; RCA pin jacks to which the audio signals outputted by the audio information processing part are guided; connection detecting switches provided in the vicinity of the RCA pin jacks; and an output audio setting part for setting the audio signals outputted by the audio information processing part to signals of kinds corresponding to the operating states of the connection detecting switches. When a switch operating connection plug in which a form except the length of a signal side contact corresponds to the standard of an RCA pin plug and the length of the signal side contact is longer than the standard of the RCA pin plug is connected to the RCA pin jack, the connection detecting switches are respectively attached to positions to be operated by the signal side contact of the switch operating connection plug, and when the RCA pin plug is connected to the RCA pin jack, the connection detecting switches are respectively attached to positions not to be operated by the signal side contact of the RCA pin plug. When the operating states of the connection detecting switches show that the switch operating connection plug is not connected to the RCA pin jack, the output audio setting part sets the audio signals outputted by the audio information processing part to the signals of the kinds set by a user.

Namely, when the RCA pin plug is connected to the RCA pin jack, the connection detecting switch does not operate. Accordingly, the audio signal outputted from the RCA pin jack shows a signal of a kind set by the user. On the other hand, when the switch operating connection plug is connected to the RCA pin jack, the connection detecting switch operates. Accordingly, the audio signal outputted from the RCA pin jack is automatically set to the signal of a kind corresponding to the connecting state.

Further, an adapter for a plug according to the present invention includes: a plug part in which a form except the length of a signal side contact corresponds to the standard of an RCA pin plug and the length of the signal side contact is longer than the standard of the RCA pin plug and a jack part whose signal side contact is electrically connected to the signal side contact of the plug part, whose earth side contact is electrically connected to the earth side contact of the plug part and to which the RCA pin plug can be connected. The jack part is formed integrally with the plug part.

That is, in an optical disk reproducing device including: an audio information processing part for inputting audio information reproduced from an optical disk and outputting audio signals obtained by performing a prescribed process to the audio information; RCA pin jacks to which the audio signals outputted by the audio information processing part are guided; connection detecting switches provided in the vicinity of the RCA pin jacks; and an output audio setting part for setting the audio signals outputted by the audio information processing part to signals of kinds corresponding to the detected results of the connection detecting switches, wherein when a switch operating connection plug in which a form except the length of a signal side contact corresponds to the standard of an RCA pin plug and the length of the signal side contact is longer than the standard of the RCA pin plug is connected to the RCA pin jack, the connection detecting switches are respectively attached to positions to be operated by the signal side contact of the switch operating connection plug, and when the RCA pin plug is connected to the RCA pin jack, the connection detecting switches are respectively attached to positions not to be operated by the signal side contact of the RCA pin plug, and when the operating states of the connection detecting switches show that the switch operating connection plug is not connected to the RCA pin jack, the output audio setting part sets the audio signals outputted by the audio information processing part to the signals of the kinds set by a user, the plug part is connected to the RCA pin jack of the device and the RCA pin jack is connected to the jack part. In this case, even when a cable having the RCA pin plugs connected to both sides of end parts is used, the audio signal outputted from the RCA pin jack of the device can be set to a signal of a kind corresponding to the connecting state.

According to the present invention, when the RCA pin plug is connected to the RCA pin jack, the connection detecting switch does not operate. Accordingly, the audio signal outputted from the RCA pin jack shows a signal of a kind set by the user. On the other hand, when the switch operating connection plug is connected to the RCA pin jack, the connection detecting switch operates. Accordingly, the audio signal outputted from the RCA pin jack is automatically set to the signal of a kind corresponding to the connecting state. Further, one of the analog audio signals of the two channels is not connected, the message showing this fact is displayed. Therefore, an automatic setting of a kind of audio corresponding to the connecting state and a setting of a kind of audio by the user can be switched depending on a kind of a plug connected to the RCA pin jack and when one of the analog audio signals of the two channels is not connected, this fact can be informed.

Further, according to the present invention, when the RCA pin plug is connected to the RCA pin jack, the connection detecting switch does not operate. Accordingly, the audio signal outputted from the RCA pin jack shows a signal of a kind set by the user. On the other hand, when the switch operating connection plug is connected to the RCA pin jack, the connection detecting switch operates. Accordingly, the audio signal outputted from the RCA pin jack is automatically set to the signal of a kind corresponding to the connecting state. Accordingly, an automatic setting of a kind of audio corresponding to the connecting state and a setting of a kind of audio by the user can be switched depending on a kind of a plug connected to the RCA pin jack.

Further, according to the present invention, in an optical disk reproducing device including: an audio information processing part for inputting audio information reproduced from an optical disk and outputting audio signals obtained by performing a prescribed process to the audio information; RCA pin jacks to which the audio signals outputted by the audio information processing part are guided; connection detecting switches provided in the vicinity of the RCA pin jacks; and an output audio setting part for setting the audio signals outputted by the audio information processing part to signals of kinds corresponding to the detected results of the connection detecting switches, wherein when a switch operating connection plug in which a form except the length of a signal side contact corresponds to the standard of an RCA pin plug and the length of the signal side contact is longer than the standard of the RCA pin plug is connected to the RCA pin jack, the connection detecting switches are respectively attached to positions to be operated by the signal side contact of the switch operating connection plug, and when the RCA pin plug is connected to the RCA pin jack, the connection detecting switches are respectively attached to positions not to be operated by the signal side contact of the RCA pin plug, and when the operating states of the connection detecting switches show that the switch operating connection plug is not connected to the RCA pin jack, the output audio setting part sets the audio signals outputted by the audio information processing part to the signals of the kinds set by a user, when the plug part is connected to the RCA pin jack of the device and the RCA pin jack is connected to the jack part, even if a cable having the RCA pin plugs connected to both sides of end parts is used, the audio signal outputted from the RCA pin jack of the device can be set to a signal of a kind corresponding to the connecting state. Therefore, when the kind of audio corresponding to the connecting state is automatically set, the cable having the RCA plugs connected to both the sides of the end parts can be used.

BRIEF DESCRIPTION OF THE DRAWINGS

These and other objects and advantages of this invention will become more fully apparent from the following detailed description taken with the accompanying drawings in which:

FIG. 1 is a block diagram showing an electric structure of a DVD player as one embodiment of an optical disk reproducing device according to the present invention;

DETAILED DESCRIPTION OF THE EMBODIMENTS

Figure 2A:
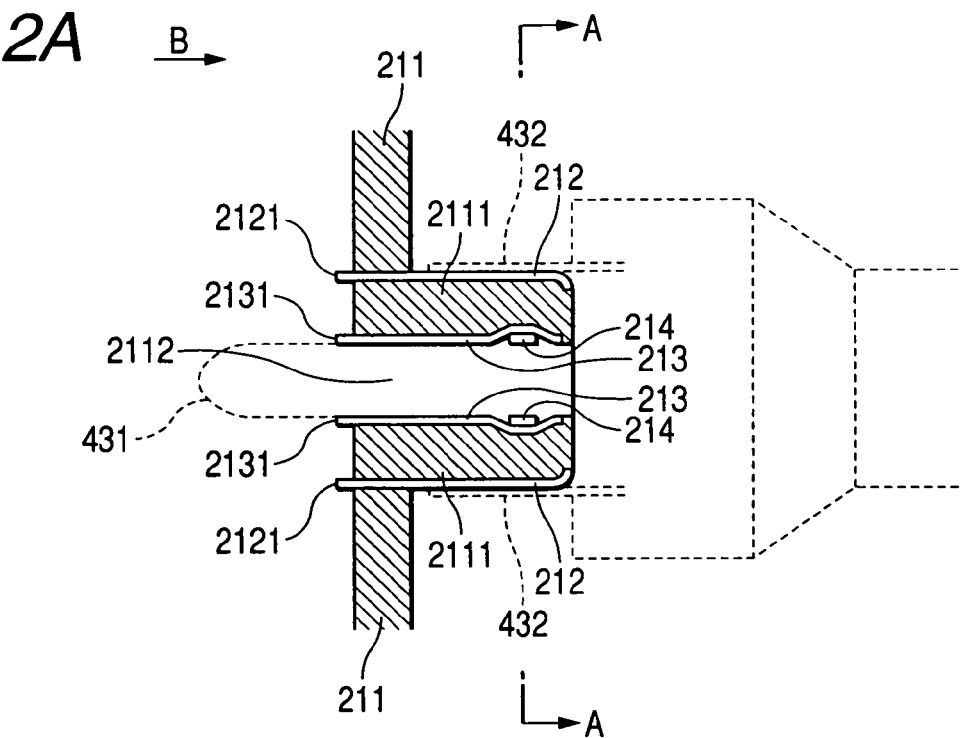
FIGS. 2A to 2C are explanatory views showing the structure of an RCA pin jack.

Now, an embodiment of the present invention will be described below by referring to the drawings.

FIG. 1 is a block diagram showing an electric structure of a DVD player as one embodiment of an optical disk reproducing device according to the present invention.

In the drawing, an optical pick-up 3 reads information recorded on a DVD (an optical disk) rotated and driven by a disk motor 2 and outputs the information to a signal processing part 4. The signal processing part 4 amplifies an RF signal outputted from the optical pick-up 3 and then takes out digital data. Then, the signal processing part performs a prescribed process (8-16 demodulation and an error correction) and outputs obtained video and audio information to a stream separating part 5.

The stream separating part 5 separates the video and audio information outputted from the signal processing part 4 into video information, sub-picture information and audio information. Then, the stream separating part transmits the separated video information to a video signal decoding part 6 and the separated audio information to an audio information processing part 8 (the sub-picture information is transmitted to a processing part for a sub-picture, however, an illustration of this processing part is omitted). Further, the stream separating part 5 transmits information of a recording position of data recorded on the DVD 1 to a microcomputer 9.

The video signal decoding part 6 decodes the video information by an MPEG 2 system to demodulate a digital video signal. Further, the video signal decoding part generates a signal showing information such as characters instructed from the microcomputer 9 and superimposes the signal on the digital video signal by using an on-screen display part not shown in the drawing. A D/A converting part 7 converts the digital video signal transmitted from the video signal decoding part 6 to an analog video signal and outputs the analog video signal to an output terminal 24 for a video signal.

The audio information processing part 8 outputs one of analog audio signals of two channels obtained by applying a prescribed process to the audio information transmitted from the stream separating part 5 to a first RCA pin jack 21 as an audio output terminal. Further, the audio information processing part outputs the other of the analog audio signals of the two channels to a second RCA pin jack 22 as an audio output terminal. Further, the audio information processing part outputs a digital audio signal based on the audio information transmitted from the stream separating part 5 to a third RCA pin jack 23 as a coaxial output terminal. Accordingly, the audio information processing part 8 includes a decoding part 11, a down-mix part 12 and a D/A converting part 13.

The decoding part 11 extends the audio information transmitted from the stream separating part 5 by a prescribed system to demodulate information showing an audio of a 5.1 ch and transmits the information to the down-mix part 12. When an instruction is supplied for outputting the audio of a 2 ch, the down-mix part 12 mixes the information showing the audio of the 5.1 ch to generate a digital audio signal showing the audio of the 2 ch and transmits the digital audio signal to the D/A converting part 13. In the case of an output of the audio of the 5.1 ch, the down-mix part transmits a digital audio signal showing an audio of right and left parts in a front side of the audio of the 5.1 ch to the D/A converting part 13.

The D/A converting part 13 converts the digital audio signal of the 2 ch transmitted from the down-mix part 12 to a pair of right and left analog audio signals and transmits the analog audio signals to the first RCA pin jack 21 and the second RCA pin jack 22.

A first connection detecting switch 31 (refer it to as a first switch 31, hereinafter) is provided in the vicinity of the first RCA pin jack 21 to detect whether or not a switch operating connection plug (described below in detail) is connected to the first RCA pin jack 21. A second connection detecting switch 32 (refer it to as a second switch 32, hereinafter) is provided in the vicinity of the second RCA pin jack 22 to detect whether or not the switch operating connection plug is connected to the second RCA pin jack 22. A third connection detecting switch 33 (refer it to as a third switch 33, hereinafter) is provided in the vicinity of the third RCA pin jack 23 to detect whether or not the switch operating connection plug is connected to the third RCA pin jack 23.

Figure 2B:
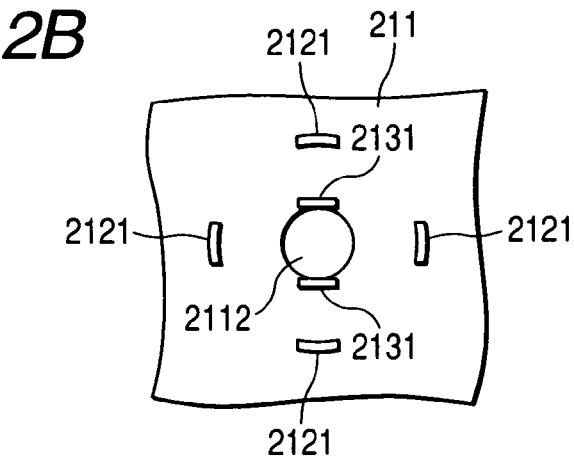
Figure 2C:
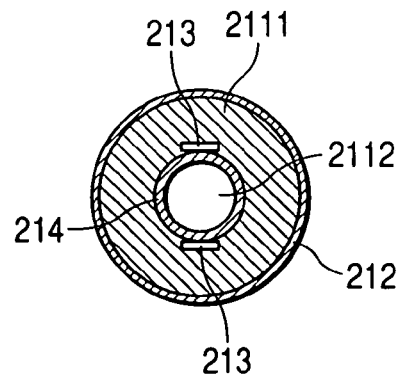

Now, referring to FIGS. 2A to 2C, the structures of the first to third RCA pin jacks 21 to 23 will be described below. FIG. 2A is a sectional view, FIG. 2B is a side view viewed in the direction of an arrow mark B, and FIG. 2C is a sectional view taken along a line A-A. All the first to third RCA pin jacks 21 to 23 have the same structures.

The RCA pin jack includes a substantially cylindrical earth side contact 212 attached to an outer peripheral surface of a substantially cylindrical protruding part 2111 formed on an insulating base 211 and having a round hole 2112. Further, the RCA pin jack includes a pair of substantially rectangular signal side contacts 213 attached to positions opposed to each other with a center held between them on an inner peripheral surface of the round hole 2112. Further, on the earth side contact 212, four protrusions 2121 are formed. The four protrusions 2121 protrude to the back side of the insulating base 211 so that the earth side contact 212 is fixed to the insulating base 211. End parts 2131 of the signal side contacts 213 protrude to the back side of the insulating base 211.

Further, on the inner peripheral surface of the round hole 2112, a ring shaped contact 214 made of metal is provided to effectively come into contact with a signal side contact provided in a plug (shown by a broken line 431). The pair of the signal side contacts 213 are electrically connected to the ring shaped contact 214.

The RCA pin jack has the above-described form. That is, the RCA pin jack is constructed so that the signal side contact 431 of the plug side can be inserted into the round hole 2112 to protrude to the back side of the insulating base 211. Further, since the signal side contact 431 can protrude to the back side of the insulating base 211, though the signal side contact of the RCA pin jack is divided into two members 213, the signal side contacts 213 can assuredly come into contact with the signal side contact 431 of the plug side by providing the ring shaped contact 214.

Figure 3:
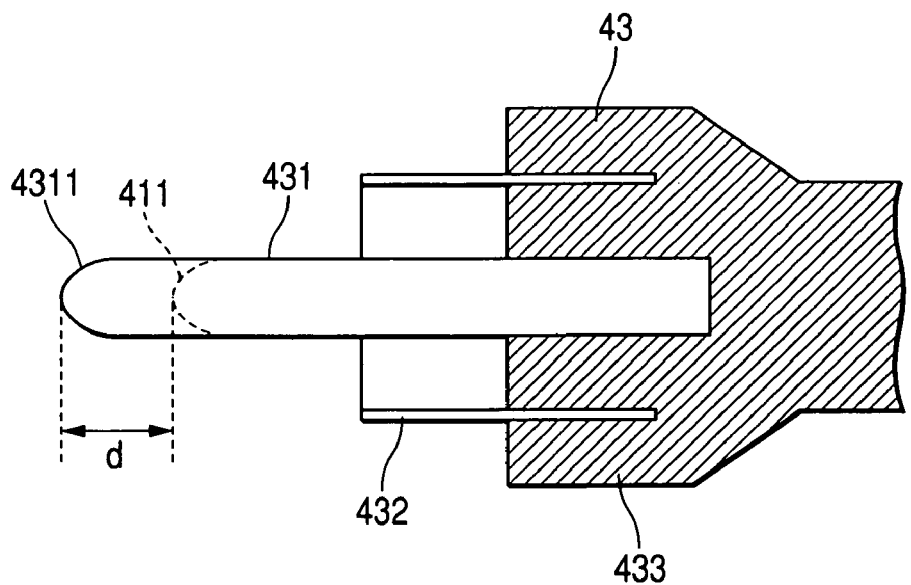
FIG. 3 is a sectional view showing the structure of a switch operating connection plug.

Now, referring to FIG. 3, the form of a switch operating connection pug used in this embodiment will be described below.

The form of the switch operating connection plug 43 shows a form corresponding to the standard of an RCA pin plug except the length of the signal side contact 431. The length of the signal side contact 431 is longer by d (a prescribed amount) toward an end 4311 side than the length (length shown by a broken line 411) of the standard of the RCA pin plug. Reference numeral 432 designates an earth side contact. 433 designates an insulating member for supporting the earth side contact 432 and the signal side contact 431.

Figure 4:
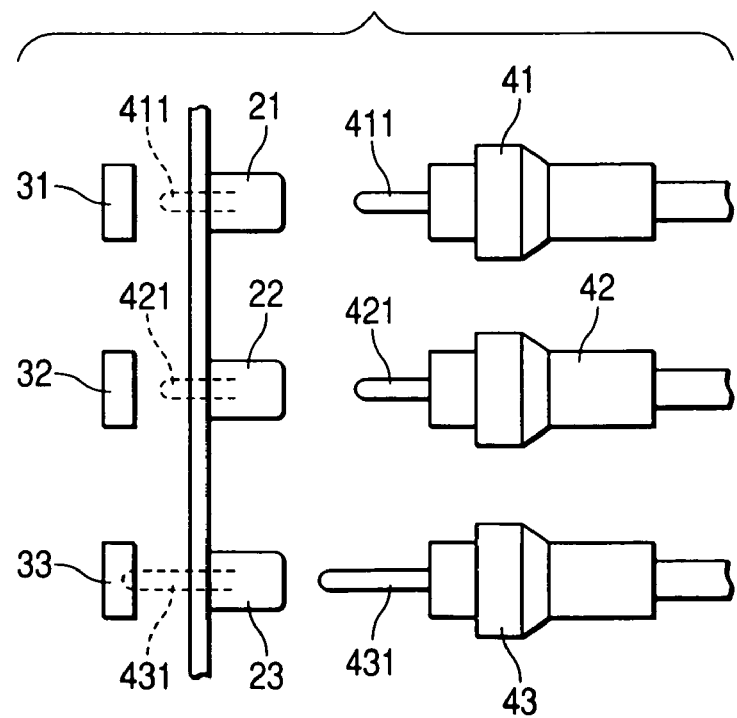
FIG. 4 is an explanatory view showing the attaching positions of connection detecting switches.

FIG. 4 shows the attaching positions of the first to third switches 31 to 33. That is, when the RCA pin plugs (designated by 41 and 42) are connected to the first to third RCA pin jacks 21 to 23, the first to third switches 31 to 33 are respectively attached at positions separate from the end parts of the signal side contacts 411 and 421 of the RCA pin plugs. When the switch operating connection plug (designated by 43) is connected to the first to third RCA pin jacks, the first to third switches are respectively attached at positions where the end part of the signal side contact 431 reaches to operate (turn on) the switches.

Now, the description will be returned to a description with reference to FIG. 1. The microcomputer 9 controls main operations as the DVD player. That is, when a user inputs an instruction for reproducing information, the microcomputer controls to reproduce the information recorded on the DVD 1 to transmit the video signal from the output terminal 24. Further, the microcomputer uses the first to third RCA pin jacks 21 to 23 to transmits the audio signal corresponding to the 5.1 ch or the audio signal corresponding to the 2 ch in accordance with the operating states of the first to third switches 31 to 33. Accordingly, the microcomputer includes an output audio setting part 14.

The output audio setting part 14 sets the analog audio signals of the two channels and the digital audio signal outputted from the audio information processing part 8 to signals of kinds corresponding to the operating states of the first to third switches 31 to 33. That is, when at least one of the first switch 31 and the second switch 32 detects the connection of the switch operating connection plug 43 and the third switch 33 does not detect the connection of the switch operating connection plug 43, the output audio setting part sets the kind of the audio outputted by the audio information processing part 8 to the audio for the 2 ch. Further, when the third switch 33 detects the connection of the switch operating connection plug 43, the output audio setting part sets the kind of the audio outputted by the audio information processing part 8 to the audio of the 5.1 ch. Further, all the first to third switches 31 to 33 do not detect the connection of the switch operating connection plug 43, the output audio setting part sets the audio outputted by the audio information processing part 8 to a kind of audio previously set by the user.

Namely, when any one of the first to third switches 31 to 33 detects the connection of the switch operating connection plug 43, the output audio setting part 14 automatically sets the kind of the audio outputted by the audio information processing part 8 in accordance with the detected result. On the other hand, when any of the first to third switches 31 to 33 does not detect the connection of the switch operating connection plug 43, the output audio setting part sets the kind of the audio to a kind of audio set by the user. That is, the setting of the kind of the audio is changed to a manual setting from an automatic setting.

Figure 5:
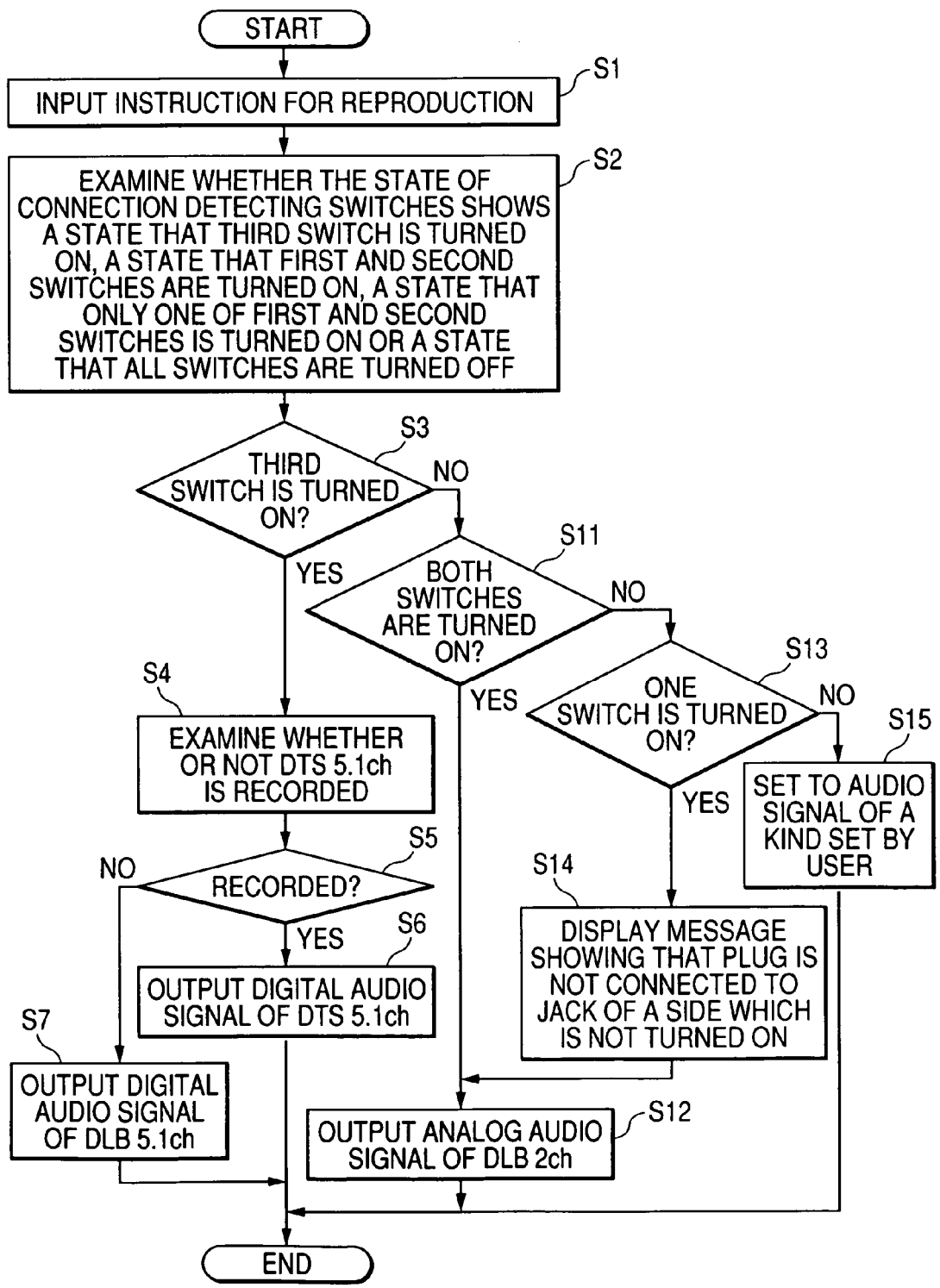
FIG. 5 is a flowchart showing main operations of an embodiment when kinds of audio are set.

FIG. 5 is a flowchart showing the main operations of the embodiment when the kind of the audio is set. An operation of the embodiment will be described by referring to FIG. 5 if necessary.

Figure 6A:
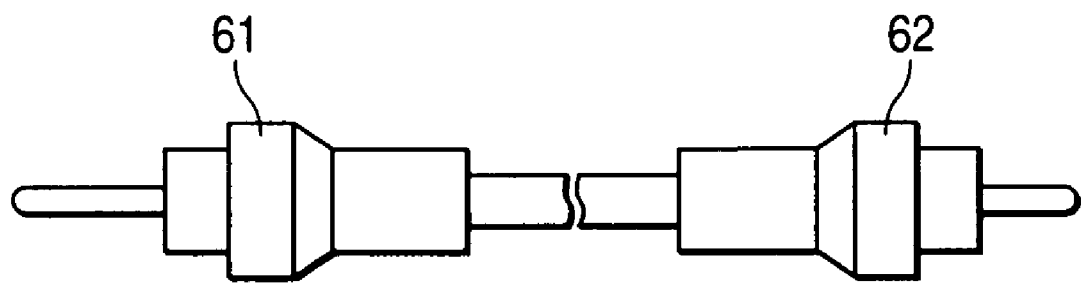
FIGS. 6A and 6B are explanatory views showing a connecting cable.
Figure 7A:
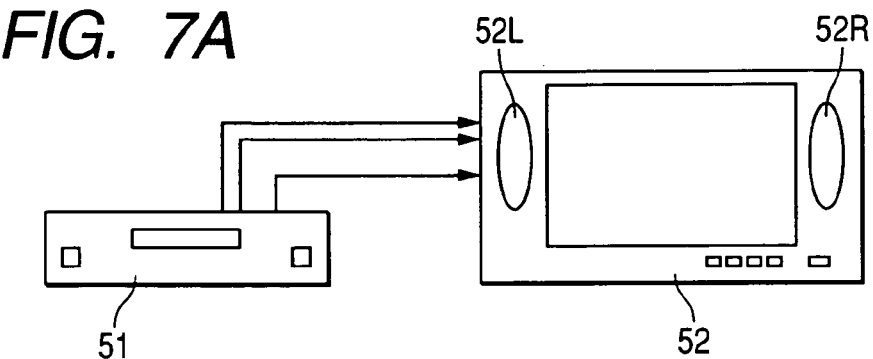
FIGS. 7A and 7B are explanatory views showing a connecting example of an external device.

It is assumed that a connection shown in FIG. 7A is now achieved. That is, it is assumed that the analog audio signals of the two channels outputted from the first and second RCA pin jacks 21 and 22 are guided to right and left audio inputs of a television receiver 52. Further, it is assumed that for this connection, as shown in FIG. 6A, a cable is used having a switch operating connection plug 61 connected to one side of the cable and an RCA pin plug 62 connected to the other side and the switch operating connection plug 61 is used for a connection to the side of this embodiment 51.

Under the above-described connection, when an instruction for reproducing information (step S1), the output audio setting part 14 examines whether the on/off states of the first to third switches 31 to 33 are brought to a state in which the third switch 33 is turned on, a state in which both the first and second switches 31 and 32 are turned on, a state in which one of the first and second switches 31 and 32 is turned on, or a state in which all the switches 31 to 33 are turned off (step S2).

At this time, since the third switch 33 is turned off and the first switch 31 and the second switch 32 are turned on, the operation shifts to step S3, step S11 and step S12 and the output audio setting part 14 sets the audio information processing part 8 so as to output the analog audio signals of the two channels from the first and second RCA pin jacks 21 and 22. Therefore, from speakers 52L and 52R of the television receiver 52, stereo audio down mixed in the down-mix part 12 is outputted.

In the above-described connection, when one of the connection of the switch operating connection plug 61 to the first RCA pin jack 21 or the connection of the switch operating connection plug 61 to the second RCA pin jack 22 is forgotten, the operation shifts to the steps S1 to S3, S11 and S13 to display on the television receiver (a display device) 52 a message showing that the cable is not connected to the RCA pin jack of either the first switch 31 or the second switch 32 that is not turned on (step S14). Even at this time, the down-mixed analog audio signals of the 2 ch are outputted to the first and second RCA pin jacks 21 and 22 (step S12).

Figure 7B:
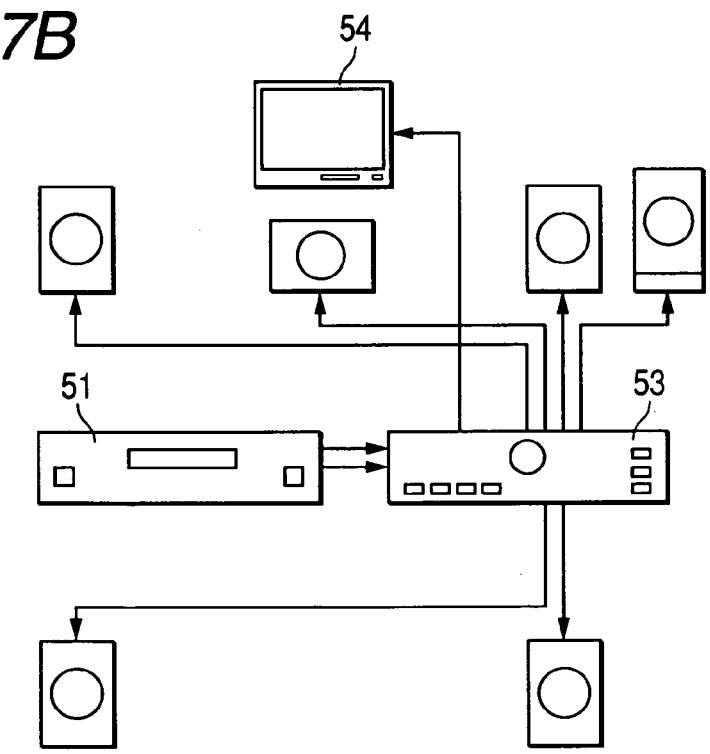

It is assumed that a connection shown in FIG. 7B is now achieved. That is, it is assumed that the video signal transmitted from the output terminal 24 is guided to a television receiver 54 through a decoder incorporated amplifier (refer it simply to as an amplifier, hereinafter) 53. Further, it is assumed that the digital audio signal transmitted form the third RCA pin jack 23 is guided to the amplifier 53. Then, it is assumed that a group of speakers corresponding to the audio signal of the 5.1 ch are connected to the amplifier 53. Further, it is assumed that the switch operating connection plug 61 is used for a connection to the embodiment 51. That is, it is assumed that since the switch operating connection plug 61 is connected to the third RCA pin jack 23, third switch 33 is turned on.

Under the above-described connection, the operation shifts to the steps S1 to S4 to examine whether or not the audio information of the DTS 5.1 ch is recorded on the DVD 1. Then, when the audio information is not recorded on the DVD 1, the output audio setting part 14 sets the audio information processing part 8 so as to transmit the digital audio signal of the 5.1 ch from the third RCA pin jack 23 (steps S5, S7). On the other hand, when the audio information of the DTS 5.1 ch is recorded on the DVD 1, the output audio setting part 14 sets the audio information processing part 8 so as to transmit the digital audio signal of the DTS 5.1 ch from the third RCA pin jack 23 (steps S5, S6)

Figure 6B:
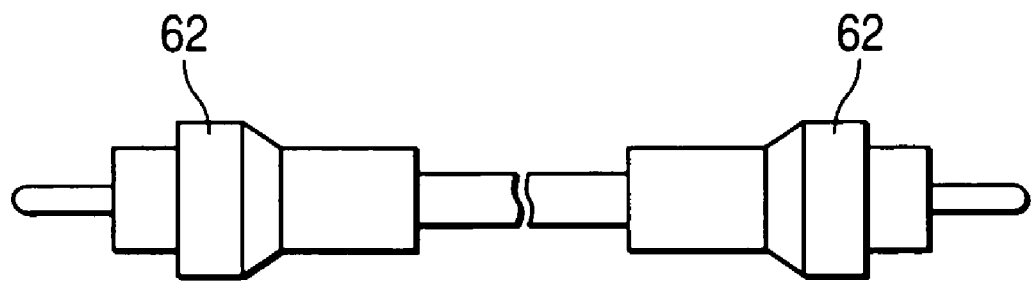

On the other hand, it is assumed that the user employs a cable having RCA pin plugs 62 connected to both end parts of the cable as shown in FIG. 6B to achieve the connection shown in FIG. 7A or FIG. 7B. At this time, all the connection detecting switches 31 to 33 are turned off. Accordingly, at this time, when an instruction is inputted for reproducing information, the operation shifts to the steps S1 to S3, S11, S13 and S15, and the output audio setting part 14 sets the kind of the audio outputted by the audio information processing part 8 in accordance with a setting previously inputted by the user.

As described above, when the switch operating connection plug 61 is used as a plug connected to the first to third RCA pin jacks 21 to 23, the kind of the audio is automatically set. When the RCA pin plug 62 is used, the kind of the audio is set to a kind of audio previously set by the user. Namely, to automatically set the kind of the audio, the switch operating connection plug 61 needs to be used. Therefore, even when a marketed connection cable having an arbitrary length is employed, if the kind of the audio can be automatically set, the cable is conveniently maneuverable.

Figure 8:
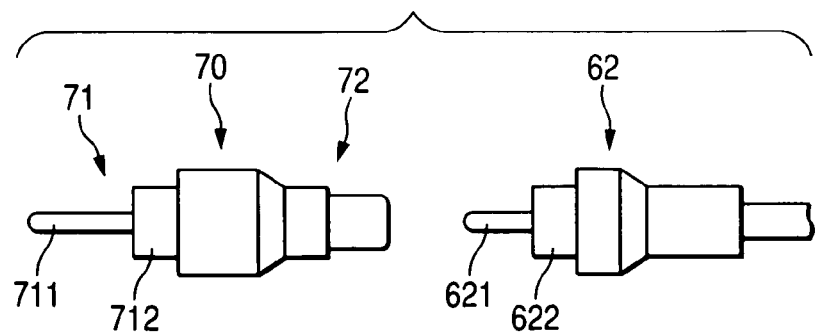
FIG. 8 is an explanatory view showing an adapter for a plug.

FIG. 8 shows an adapter for a plug that makes it possible to use a marketed cable. A plug part 71 formed in one side of an adapter for a plug 70 has a form except the length of a signal side contact 711 corresponding to the standard of an RCA pin plug. The length of the signal contact 711 is longer toward an end side than the length in the standard of the RCA pin plug. Further, a side opposed to the plug part 71 serves as a jack part 72 to which the RCA pin plug 62 can be connected. The jack part 72 is electrically connected to the plug part 71.

Accordingly, when the RCA pin plug 62 is connected to the jack part 72, the signal side contact 621 of the RCA pin plug 62 is electrically connected to the signal side contact 711 of the plug part 71. Further, the earth side contact 622 of the RCA pin plug 62 is electrically connected to the earth side contact 712 of the plug part 71. Then, when the plug part 71 of the adapter for a plug 70 is connected to the first to third RCA pin jacks 21 to 23, the first to third switches 31 to 33 operate.

The present invention is not limited to the above-described embodiment in which the invention is applied to the DVD player, however, the present invention may be similarly applied to a device having an image recording function (for instance, a DVD recorder, a DVD recorder formed integrally with a hard disk drive, etc.).

Further, the list (the audio of the 2 ch when the first and second switches 31 and 32 are turned on, the audio of the 2 ch and the audio of the 5.1 ch when the third switch 33 is turned on) of the kinds of audio that can be outputted correspondingly to the operating states of the first to third switches 31 to 33 can be displayed as information on a screen for setting the kinds of audio.

What is claimed is:

1. An optical disk reproducing device comprising:
    an audio information processing part for inputting audio information reproduced from an optical disk and outputting analog audio signals of two channels obtained by performing a prescribed process to the audio information and a digital audio signal based on the audio information;
    a first RCA pin jack to which one signal of the analog audio signals of the two channels is guided;
    a second RCA pin jack to which the other signal of the analog audio signals of the two channels is guided;
    a third RCA pin jack to which the digital audio signal is guided;
    a first connection detecting switch provided in the vicinity of the first RCA pin jack;
    a second connection detecting switch provided in the vicinity of the second RCA pin jack;
    a third connection detecting switch provided in the vicinity of the third RCA pin jack; and
    an output audio setting part for setting the analog audio signals and the digital audio signal outputted by the audio information processing part to signals of kinds corresponding to the operating states of the first to third connection detecting switches, wherein:
    when a switch operating connection plug in which a form except the length of a signal side contact corresponds to the standard of an RCA pin plug and the length of the signal side contact is longer than the standard of the RCA pin plug is connected to the corresponding RCA pin jack of the first to third RCA pin jacks, the first to third connection detecting switches are respectively attached to positions to be operated by the signal side contact of the switch operating connection plug, and when the RCA pin plug is connected to the corresponding RCA pin jack of the first to third RCA pin jacks, the first to third connection detecting switches are respectively attached to positions not to be operated by the signal side contact of the RCA pin plug; and
    when the operating states of the first to third connection detecting switches show that the switch operating connection plug is not connected to any of the first to third RCA pin jacks, the output audio setting part sets the audio signals outputted by the audio information processing part to the signals of the kinds set by a user, and when only one of the first connection detecting switch and the second connection detecting switch is in an operating state, the output audio setting part sets the analog audio signals of the two channels outputted by the audio information processing part to the signals corresponding to the audio of the two channels and displays on a display device a message showing that a connection of one of the RCA pin jack of the first or the second RCA pin jack is not carried out.

2. An optical disk reproducing device comprising:
    an audio information processing part for inputting audio information reproduced from an optical disk and outputting audio signals obtained by performing a prescribed process to the audio information;
    RCA pin jacks to which audio signals outputted by the audio information processing part are guided;
    connection detecting switches provided in the vicinity of the RCA pin jacks; and
    an output audio setting part for setting the audio signals outputted by the audio information processing part to signals of kinds corresponding to the operating states of the connection detecting switches, wherein;
    when a switch operating connection plug in which a form except the length of a signal side contact corresponds to the standard of an RCA pin plug and the length of the signal side contact is longer than the standard of the RCA pin plug is connected to the RCA pin jack, the connection detecting switches are respectively attached to positions to be operated by the signal side contact of the switch operating connection plug, and when the RCA pin plug is connected to the RCA pin jack, the connection detecting switches are respectively attached to positions not to be operated by the signal side contact of the RCA pin plug; and when the operating states of the connection detecting switches show that the switch operating connection plug is not connected to the RCA pin jack, the output audio setting part sets the audio signals outputted by the audio information processing part to the signals of the kinds set by a user.

* * * * *